United States Patent [19]

Barbaudy et al.

[11] 4,257,671
[45] Mar. 24, 1981

[54] FIXED OPTICAL ATTENUATOR FOR LIGHT RAYS GUIDED BY OPTICAL FIBRES

[75] Inventors: Alain Barbaudy, Montreuil; Jacques Galaup, Gravigny-Longjumeau, both of France

[73] Assignee: Compagnie Industrielle des Telecommunications Cit-Alcatel, Paris, France

[21] Appl. No.: 23,915

[22] Filed: Mar. 26, 1979

[30] Foreign Application Priority Data

Apr. 14, 1978 [FR] France ............... 78 11048

[51] Int. Cl.³ .................................. G02B 5/14
[52] U.S. Cl. ...................... 350/96.15; 350/96.18; 350/439; 350/314
[58] Field of Search ............... 350/96.10, 96.12, 96.15, 350/96.16, 96.18, 96.29, 195, 196, 314

[56] References Cited

U.S. PATENT DOCUMENTS

| | | | |
|---|---|---|---|
| 2,981,826 | 4/1961 | Mattern | 350/96.15 |
| 3,761,184 | 9/1973 | McLaughlin, Jr. | 350/196 |
| 3,829,195 | 8/1974 | Rawson | 350/96.18 |
| 3,944,327 | 3/1976 | Larsen | 350/96.21 |
| 3,970,360 | 7/1976 | Kersten | 350/96.15 |
| 4,102,559 | 7/1978 | Hunzinger | 350/96.18 |

FOREIGN PATENT DOCUMENTS

| | | |
|---|---|---|
| 2135254 | 9/1972 | Fed. Rep. of Germany ........ 350/96.18 |
| 2546861 | 4/1977 | Fed. Rep. of Germany ........ 350/96.18 |
| 2608789 | 9/1977 | Fed. Rep. of Germany ........ 350/96.18 |

OTHER PUBLICATIONS

K. Usui et al., "Three-way Optical Directional Coupler", Mar. 1978.

*Primary Examiner*—Stewart J. Levy
*Attorney, Agent, or Firm*—Sughrue, Rothwell, Mion, Zinn and Macpeak

[57] ABSTRACT

The present invention relates to the optical fibre technology and more particularly to fixed optical attenuators for insertion in an optical fibre transmission path. The optical attenuator includes an attenuator element 1, two lenses 2, 3 which are aligned with each other and separated by the attenuator element 1 and two optical fibre connections disposed on either side of the assembly formed by the lenses 2, 3 and the attenuator element 1. It may be used as a level adaptor between a source of light rays and a device which is connected to it by an optical fibre or in test, calibration or measuring instruments for optical fibre systems.

3 Claims, 1 Drawing Figure

U.S. Patent  Mar. 24, 1981  4,257,671
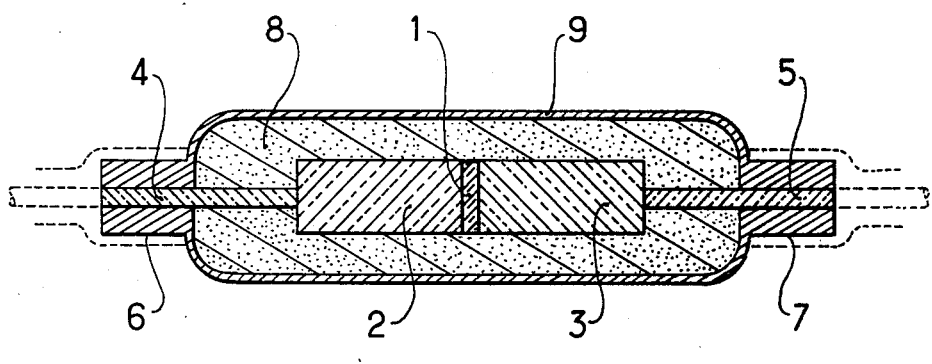

4,257,671

FIXED OPTICAL ATTENUATOR FOR LIGHT RAYS GUIDED BY OPTICAL FIBRES

FIELD OF THE INVENTION

The present invention relates to optical fibre technology and more particularly to optical attenuators which may be used as level adaptors between a source of light rays and a device which is connected thereto by an optical fibre, and/or in test, calibration or measuring equipment for optical fibre systems.

BACKGROUND OF THE INVENTION

An optical attenuator is already known which can be used in optical fibre systems. It is constituted by two microscope objective lenses separated by an absorbent substance and connected by short optical fibres to connectors which enable the attenuator to be inserted in an optical fibre link. The microscope lenses are used to make the light beam parallel where it travels through the absorbent substance. These lenses give rise to various disadvantages. It is tricky to position them with respect to the ends of the optical fibres which connect them to the connectors and this makes it necessary to use precision tooling such as micromanipulators. They also cause spurious reflections which must be attenuated by surface treatments which entail technological complications. Lastly, they are bulky, expensive and fragile.

SUMMARY OF THE INVENTION

The invention aims to reduce these disadvantages by providing an optical attenuator for optical fibre guided light which is not bulky or expensive, and which is simple, strong, and easy to use.

It provides a fixed optical attenuator for light rays guided by optical fibres, the attenuator comprising an attenuator element and two plane, graded index lenses in alignment with each other and separated by the attenuator element formed by an organic or an inorganic medium which is transparent to the wavelength of the light rays and which is doped with one or more substances which have an absorption band at said wavelength.

The various components can be assembled by gluing and may be covered with polymerized silicone paste and disposed in a housing on which connectors may be fixed.

BRIEF DESCRIPTION OF THE DRAWING

An embodiment of the invention is described by way of example with reference to the accompanying drawing in which the single FIGURE is a longitudinal cross-section of a fixed optical attenuator in accordance with the invention.

DESCRIPTION OF THE PREFERRED EMBODIMENT

The FIGURE shows: an attenuator element 1; two plane surface lenses 2 and 3 in alignment with each other and separated by the attenuator element 1; two short optical fibres 4 and 5 separated by the lenses 2 and 3 and disposed along their axis; two connectors 6 and 7 connected to the free ends of the short optical fibres 4 and 5; a covering material 8 which surrounds the assembly formed by the attenuator element 1, the lenses 2 and 3 and the short fibres 4 and 5; and a housing 9 which contains said assembly and to which the connectors 6 and 7 are fixed.

The attenuator 1 is of constant thickness and absorbs the same proportion of energy in each transmission mode when a parallel beam of radiation passes through it. It can be constituted by any medium, whether organic or inorganic which is partially tranparent to the wavelength of the radiation in question. The medium may be doped with one or more substances which have absorption bands at the said wavelength, e.g. gelatine filter (Kodak Wratten) or an inorganic filter (Specivex MTO) or it may be covered with thin dielectric layers.

The lenses 2 and 3 have plane surfaces and an index gradient. They are made in a way known per se, by means of a short section of optical fibre with plane end surfaces, said optical fibre having an index gradient, i.e. having a refractive index n which varies according to an equation of the form:

$$n = n_0 \left[ 1 - 2 \frac{r^2}{b^2} \right]$$

$n_o$ being the value of the index at a point of the longitudinal axis of the fibre, r being the radial distance between the point in question and the axis of the fibre and b being a constant which represents the magnitude of the variation of the index as a function of the radial distance r. The ratio between the constant b and the length of the lenses 2 and 3 is chosen so that their foci are situated on their plane surfaces. The diameters of the lenses 2 and 3 are very much greater than those of the short optical fibres 4 and 5. A divergent beam emitted from the end of one of the optical fibres 4 or 5 in contact with a plane surface of one of the lenses 2 or 3 is emitted substantially at the focus thereof and is transformed, after emergence from the lens, into a parallel beam which passes through the attenuator element. Conversely, a parallel beam coming from the attenuator element 1 is concentrated by one of the lenses 2 or 3 on its point of contact with the end of one of the optical fibres 4 or 5.

The short optical fibres 4 or 5 are disposed along the longitudinal axis of the lenses. They may also have an index gradient. Advantageously, they have the same refractive index along their longitudinal axes as the lenses have along the same axis so as to reduce spurious reflections to which radiation is subject when it passes from one medium to another.

The connectors 6 and 7 are of conventional type and will not be described since they do not form a part of the invention. They are simply chosen so as to match other connectors disposed in the optical fibre system in which the attenuator is to be inserted.

The assembly of the various components is facilitated by the planeness of the surfaces of the lenses 2 and 3. It is performed by gluing using glues whose refractive indices are chosen to reduce spurious reflection. Where $n_1$ is the refractive index of one of the optical fibres 4 or 5 along its longitudinal axis and $n_o$ is the refractive index of one of the lenses 2 or 3 on the same axis, the glue used to assemble the end of the fibre to the lens should have a refractive index as close as possible to $\sqrt{n_1 . n_o}$. Likewise, if $n_2$ is the refractive index of the attenuator element 1, the glue used for assembling it should have a refractive index as close as possible to $\sqrt{n_2 n_o}$.

The assembly constituted by the attenuator element 1, the plane, graded index lenses 2 and 3 and by the short optical fibres 4 and 5 is covered with a material 8 such as a silicone paste which is transformed into resilient gum by polymerization and placed in a housing 9 which also acts as a support for the connectors 6 and 7.

The fixed optical attenuator which has just been described is noteworthy on account of its simplicity of manufacture, its small bulk analogous to that of an attenuator for coaxial lines and its ease of use. It also has very few spurious reflections because of the small number of components through which radiation passes—a very clearly smaller number than that of attenuators which include microscope lenses and because of the use of an interface (glue) with a suitable refractive index.

Without going beyond the scope of the invention, some dispositions can be modified or some means can be replaced by equivalent means.

We claim:

1. A fixed optical attenuator for light rays guided by optical fibres, said fixed optical attentuator comprising:
   an attenuator element formed by an organic or an inorganic medium which is transparent to the wavelength of the light rays and which is doped with one or more substances which have an absorption band at said wavelength;
   two graded refractive index lenses with plane faces, in axial alignment with each other and and separated by said attenuator element; and
   a short optical fibre disposed on each side of the assembly formed by said lenses and said attenuator element with said optical fibres in axial alignment with said lenses.

2. An attenuator according to claim 1, further comprising a connector disposed on the end of each of said short optical fibres for connecting said short optical fibre to the surface of a respective one of said lenses.

3. An optical attenuator according to claim 2, wherein the assembly constituted by the attenuator element, the lenses and the short optical fibres is placed in a housing which also acts as a support for the connectors.

* * * * *